Dec. 30, 1924. 1,521,586
F. W. MERRILL
MEANS FOR REGULATING THE VOLTAGE OF DISTRIBUTION SYSTEMS
Filed May 17, 1921  2 Sheets-Sheet 1

Inventor:
Frank W. Merrill.
by Hubert A. Patterson.
Atty.

Dec. 30, 1924.
F. W. MERRILL
1,521,586
MEANS FOR REGULATING THE VOLTAGE OF DISTRIBUTION SYSTEMS
Filed May 17, 1921   2 Sheets-Sheet 2
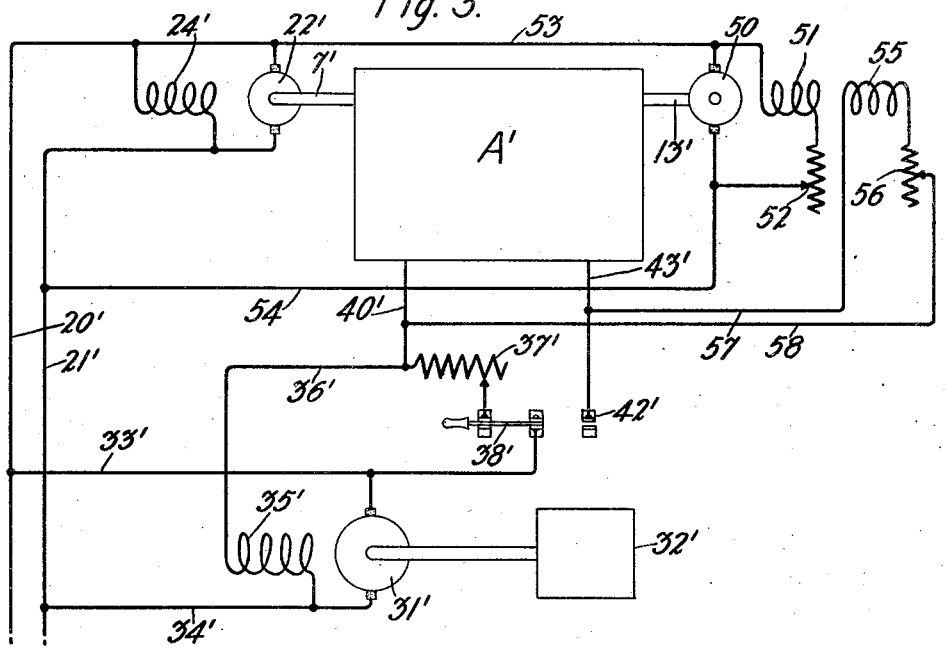
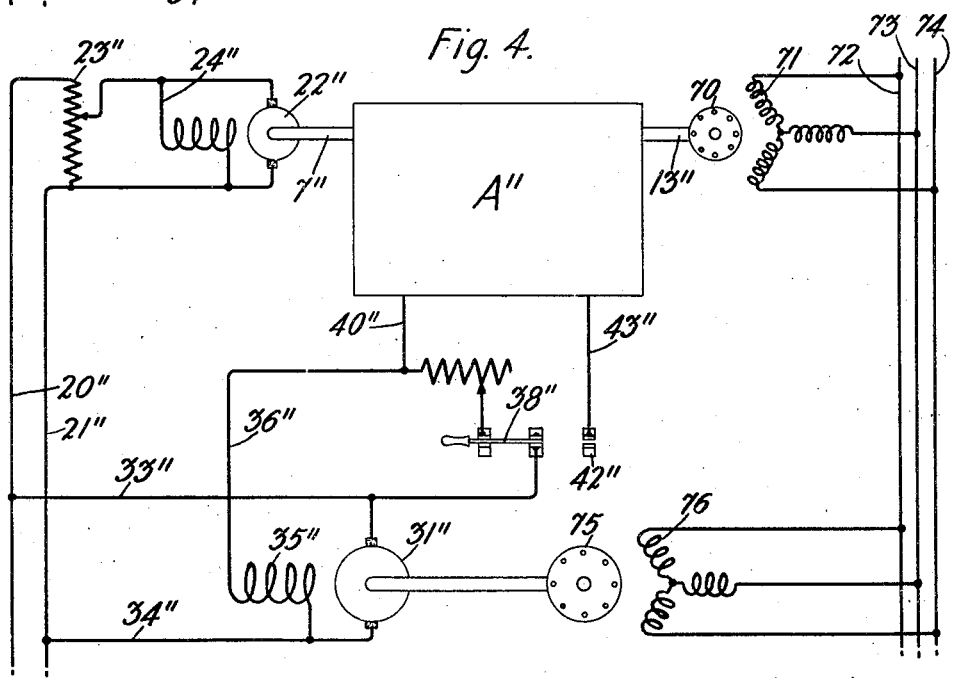
Inventor:
Frank W. Merrill
by Hubert A. Pattison
Att'y Patented Dec. 30, 1924.

1,521,586

UNITED STATES PATENT OFFICE.

FRANK W. MERRILL, OF EAST ORANGE, NEW JERSEY, ASSIGNOR TO WESTERN ELECTRIC COMPANY, INCORPORATED, OF NEW YORK, N. Y., A CORPORATION OF NEW YORK.

MEANS FOR REGULATING THE VOLTAGE OF DISTRIBUTION SYSTEMS.

Application filed May 17, 1921. Serial No. 470,472.

*To all whom it may concern:*

Be it known that I, FRANK W. MERRILL, a citizen of United States, residing at East Orange, in the county of Essex, State of New Jersey, have invented certain new and useful Improvements in Means for Regulating the Voltage of Distribution Systems, of which the following is a full, clear, concise, and exact description.

This invention relates to improved means for regulating the voltage of a distribution system or the output of a dynamo-electric machine.

The primary object of the invention is to provide a voltage regulator for distribution systems which is automatic and accurate in its operation, and employs a minimum number of elements so that its initial cost and maintenance is small.

More specifically, the regulator comprises a variable impedance device consisting of a rotary impedance element and a second element cooperating therewith, a relative movement between the elements varying the value of the impedance. One of the elements is rotated by means which varies in speed proportionally to the voltage in the system to be regulated, while the other element rotates at a constant speed.

In the accompanying drawings which illustrate several embodiments of the invention, Fig. 1 is a schematic illustration of a distribution system provided with a regulator constructed in accordance with the invention, showing one of the elements of the variable impedance device operated at a constant speed through the medium of a synchronous motor.

Fig. 3 is a schematic illustration of a distribution system provided with a regulator constructed in accordance with the invention, in which both of the elements of the variable impedance device are operated by motors directly connected across the distribution circuit, the voltage of which is to be maintained constant.

Fig. 4 is a schematic illustration of a distribution system provided with a regulator constructed in accordance with the invention in which one of the elements of the variable impedance device is operated at constant speed by means of an electric motor supplied with polyphase alternating current.

Figure 1:
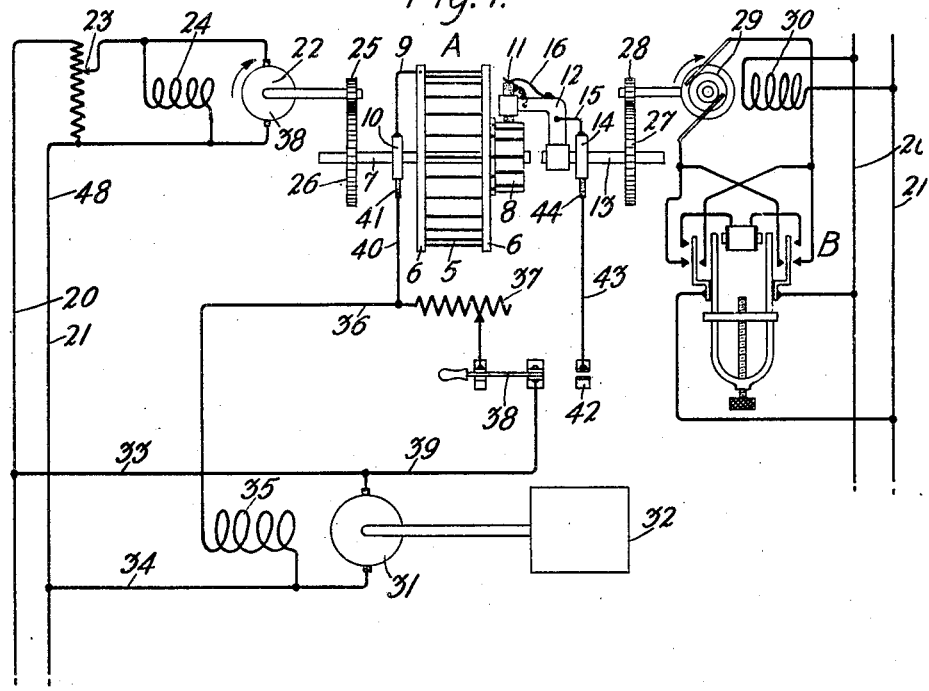
Figure 2:
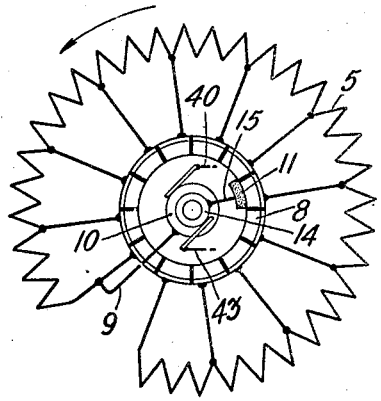
Fig. 2 is a schematic illustration of the circuit for the variable impedance device used in the system shown in Fig. 1.

Referring now to the drawings in detail, in which like numerals designate similar parts throughout the several views, and directing attention first to the system shown in Fig. 1, reference letter A indicates generally a variable impedance device of the type fully shown and described in my copending application, Serial No. 470,473, filed May 17, 1921, differing from the construction shown in said application only in that the rotating elements thereof are driven through reduction gearing. Briefly, this device comprises an impedance wire 5 wound between parallel plates 6 rotatable with a shaft 7. Sections of the impedance wire 5 are connected with the segments of a commutator 8, also secured to the shaft 7, the ends of the wire 5 being connected to adjacent segments of the commutator 8, as is illustrated in Fig. 2, one of said ends being connected by a conductor 9 to a slip-ring 10 secured to the shaft 7. Cooperating with the commutator 8 is a brush 11 carried by an L-shaped arm 12, secured to a second shaft 13, upon which is also mounted a slip-ring 14 which is electrically connected with the brush 11 by conductor 15 and arm 12, a spring 16 serving to hold the brush 11 in engagement with the commutator 8.

In the system shown in Fig. 1, 20 and 21 represent the mains of a direct current distribution circuit, the voltage of which is to be maintained constant. The armature of a motor 22 rotating in a clockwise direction is connected in series with the mains 20 and 21 which are bridged by any suitable type of potentiometer 23. The motor 22 is of the shunt type, having a shunt field winding 24, the magnetic circuit of the motor being saturated so that its speed varies directly with the voltage of the mains 20 and 21. The armature shaft of the motor 22 carries a pinion 25, meshing with a large gear 26 mounted upon the shaft 7. The impedance and commutator 8 will therefore be driven at a speed proportional to the speed of the motor 22. The shaft 13, to which the brush carrying arm 12 is secured, is provided with a large gear 27 of the same size as the large gear 26 which meshes with a pinion 28 of the same size as the pinion 25, the said pinion 28 being rotated in a clockwise direction by a synchronous motor 29, a tuning fork interrupter B of usual construction being interposed in the armature circuit thereof, the interrupter and field 30 being supplied with current from mains 20', 21' connected to a direct current source. Since the tuning fork interrupter B is of the usual type which is well known to those skilled in the art, a detailed description thereof is not thought to be necessary.

Distribution mains 20 and 21 are supplied with direct current by means of a generator 31 driven by any suitable source of power 32. The armature of the generator 31 is connected to the mains 20 and 21 by means of conductors 33 and 34 respectively. The generator 31 is of the shunt type, its shunt field winding 35 being connected at one end to the conductor 34, and its other end to the conductor 33 by means of a conductor 36, variable resistance 37, double-throw knife switch 38 and conductor 39. The field winding 35 is also connected to the slip ring 10 by means of conductors 36, 40 and brush 41. The slip ring 14 is connected to the alternate contact 42 of the switch 38 by means of a conductor 43 and brush 44, which bears against the said slip-ring.

It is believed that the operation of the system can more easily be understood if the various elements thereof are given definite values, as will be the case when the system is put in physical form.

Let it be assumed that it is desired to maintain the potential of the mains 20 and 21 constant at twenty volts, that the potentiometer 23 has been set so that the potential across the field and armature of the motor 22 is eighteen volts, that the said motor is designed to operate at a speed of 1800 R. P. M. on this voltage and that the tuning fork interrupter B has been set to maintain the speed of the motor 29 constant at 1800 R. P. M.

The operation of the system is as follows: The knife switch 38 is thrown to the position shown, the mechanism 32 which drives the dynamo 31 is started and the motor 29 set in operation and brought up to a speed of 1800 R. P. M. at which it is maintained constant through the tuning fork interrupter B. The brush 11 is now rotating at a constant speed driven by the motor 29 while the commutator 8 is revolving, driven by the motor 22 at a speed dependent upon the voltage being supplied the mains 20 and 21 by the dynamo 31. By varying the value of the impedance 37 which is in series with the shunt field 35 of the dynamo 31, the output of the dynamo may be regulated until the potential of the mains 20 and 21 is such that the motor 22 is rotating in synchronism with the motor 29. A variety of different means may be employed for indicating when these motors are running at the same speed, the variable impedance device incorporating means for giving this indication stroboscopically, as is fully described in my copending application previously referred to. Briefly, this means comprises an image (not shown) formed on the plate 6 adjacent the brush 11. Since the plate 6 is driven at a speed proportional to the motor 22 and the brush 11 at a speed proportional to the motor 29, the reduction gearing being the same, if these machines are not in synchronism, the image on the plate 6 and brush 11 will appear to move relative to each other. By varying the impedance 37, as previously explained, the voltage supplied the motor 22 by the dynamo 31 may be varied until the image on the plate 6 and the brush 11 appear to be stationary relative to each other and to rotate together, indicating that the motors 22 and 29 are operating at the same speed. After the motors are in synchronism, the switch 38 may be thrown from the position illustrated to one in which it engages the contact 42. With the switch in this position the impedance 37 will be cut out and the impedance 5 connected in series with the field 35 of the dynamo 31. The field circuit may be traced from main 21, conductor 34, field 35, conductors 36, 40, brush 41, slip-ring 10, conductor 9, impedance 5, commutator 8, brush 11, arm 12, conductor 15, slip-ring 14, brush 44, conductor 43, contact 42, knife switch 38, conductors 39 and 33 to the main 20. As long as the motors 22 and 29 rotate at the same speed there will be no relative movement between the brush 11 and commutator 8, and the amount of impedance cut into the field 35 will remain the same. If the motor 22 slows down, due to a drop in the voltage of the mains 20 and 21, the brush 11 will advance around the commutator 8 in a counter-clockwise direction, as viewed in Fig. 2, cutting out some of the impedance 5, permitting a larger flow of current in the field 35 of the dynamo 31 and increase the flux supplied the armature so that the voltage output of the said dynamo will rise, causing the motor 22 to speed up an amount sufficient to bring it back in synchronism with the motor 42. Should the voltage of the mains 20 and 21 increase, speeding up the motor 22, the commutator 8 will advance counter-clockwise relative to the brush 11 cutting more of the impedance 5 into the field 35 of the dynamo 31, reducing the flux supplied the armature and thereby lowering the voltage output thereof an amount sufficient to lower the potential of the mains 20 and 21 and reduce the speed of the motor 22 sufficiently to bring it back in synchronism with the motor 29.

From the above description it will be understood that due to the variable impedance the motors 22 and 29 will be kept in synchronism at a definite set speed, in the system above described this speed being 1800 R. P. M. as determined by the tuning fork interrupter B. Since the motor 22 is only maintained at a constant speed, due to the regulation of the potential of the mains 20 and 21, it will be appreciated that the voltage of the said mains will be kept substantially constant. This result will be accomplished even though the resistance of a load supplied by the mains 20 and 21 is variable because any change in the load which varies the voltage of the said mains results in an operation of the variable impedance device which automatically restores equilibrium. In the system just described, the potentiometer 23 has been set so that when the potential across the field and armature of the motor 22 is eighteen volts, the potential of the mains 20 and 21 is twenty volts, but the voltage of the said mains may be adjusted to any higher voltage within the capacity of the potentiometer or to any lower voltage provided the voltage desired is not below the operating voltage of the motor 22 which is eighteen volts. Of course it is apparent that, by changing the design of the motor 22 and the speed of the motor 29, practically any range of voltage through which the potentiometer may be adjusted may be secured.

The system shown in Fig. 3 is in many respects similar to that shown in Fig. 1, corresponding parts being represented by the same reference numerals with prime exponents. In this system, the shaft 7' of the variable impedance device which, for simplicity, is represented by the square A', is driven by a shunt motor 22' of the saturated field type which, however, is directly connected across the mains 20' and 21', the voltage of which is to be kept constant without the interposition of a potentiometer. The motor 22' having a saturated field, its speed varies substantially proportional with the variation in voltage of the mains 20' and 21'. The shaft 13' is driven by a shunt motor 50, the field 51 thereof having in series therewith an adjustable resistance 52, the armature and field of the motor being connected across the mains 20' and 21' by conductors 53 and 54, respectively. The motor 50 is constructed to have a large air gap characteristic so its field flux and armature voltage vary proportionally to each other as the voltage of the mains 20' and 21' varies whereby its speed is substantially constant over a wide range of applied voltages. In practice, however, it is impossible to construct a motor such as 22' having a field 100% saturated or a motor 50 with a 100% air gap characteristic. As a consequence, the speed of the motor 22' will not vary 100% accurate with the change in potential of the mains 20' and 21', tending to lag in speed relative to the applied voltage, nor will the motor 50 run at an absolutely constant speed, tending to lead in speed relative to the applied voltage. To meet the slight discrepancies of these motors a compensating shunt winding 55 is provided the motor 50 which is wound accumulatively with the field 51 thereof and is adjustable by means of a variable resistance 56. The compensating field 55 is connected across the variable impedance device A' by conductors 57 and 58 which are connected to conductors 40' and 43' respectively.

The system is started and the motors 22' and 50 brought substantially in synchronism by the use of the variable impedance 37' in the same manner as the system shown in Fig. 1 is set in operation, after which the switch 38' is thrown to cut out the impedance 37' and interpose the variable impedance device A'. Due to the slight discrepancies, previously referred to, existing in the motors 22' and 50, they cannot be brought into exact synchronism by the resistance 37'. However, after the switch 38' has been moved to cut in the variable impedance device A', current will be supplied the compensating field 55, which is in shunt of the said variable impedance device. By varying the value of the compensating field 55 by the adjustable resistance 56, the discrepancies in the speeds of the motors 22' and 50 may be compensated for and the said motors brought into exact synchronism. After the field 55 has been once adjusted, the resistance 56 may be kept in its set position. In place of the potentiometer 23 employed in the system shown in Fig. 1 to set the voltage at which the mains 20 and 21 shall be maintained, the adjustable resistance 52 is employed in the system shown in Fig. 3 to set the voltage at which the mains 20' and 21' shall be maintained. The weakening or strengthening of the field 51 causes the motor 50 to run at a faster or slower speed which, through the variable impedance device, increases or decreases the voltage output of the dynamo 31' and the potential of the mains 20' and 21' an amount sufficient to bring the motor 22' in synchronism with the motor 50.

The system shown in Fig. 4 is in many respects similar to the system shown in Fig. 1, similar elements being indicated by the same reference numerals with double prime exponents. This system differs from that shown in Fig. 1 in that the shaft 13'' of the variable impedance A'' is driven by a polyphase alternating current induction motor 70 which, as is well understood by those skilled in the art, will operate at a substantially constant speed with light load. The field 71 of the motor is energized from a source of polyphase alternating current connected to mains 72, 73 and 74. The dynamo 31″ is driven by a polyphase alternating current motor 75, the field 76 of which is excited by current from the mains 72, 73 and 74. The starting and operation of the system shown in this figure is the same as the system shown in Fig. 1, so a description thereof is not thought to be necessary.

Attention is called to the fact that while the systems shown in Figs. 1 and 3 are essentially direct current systems, the system shown in Fig. 4 is one in which alternating current is converted into direct current at a constant voltage.

What is claimed is:

1. In a system for regulating the voltage of a distribution circuit, a dynamo electric machine for supplying energy to the said circuit, a variable impedance device for controlling the field of said dynamo electric machine, said impedance device comprising two rotary elements, means responsive to the voltage of the distribution circuit for rotating one of said elements, a motor having a large air-gap characteristic supplied with energy from said distribution circuit for rotating the other element, said last named motor being provided with a compensating field winding, and means for variably exciting said winding by the variable impedance device whereby both motors rotate at the same speed.

2. A system for regulating the voltage of a distribution circuit, a source of supply for said circuit, a variable impedance device for controlling the voltage of said source, said impedance device comprising two rotary elements, a motor responsive to the voltage of the distribution circuit for rotating one of said elements, a motor having a large air-gap characteristic supplied with energy from said distribution circuit for rotating the other element, said last named motor being provided with a compensating field winding, and means for variably exciting said winding by the variable impedance device whereby both of said motors rotate at the same speed.

3. A system for regulating the voltage of a distribution circuit, a source of supply for said circuit, a variable impedance device for controlling the voltage of said source, said impedance device comprising two rotary elements, a motor responsive to the voltage of the distribution circuit for rotating one of said elements, a motor having a large air-gap characteristic supplied with energy from said distribution circuit for rotating the other element, and regulating means for said last named motor controlled by the variable impedance device whereby both of said motors rotate at the same speed.

In witness whereof, I hereunto subscribe my name this 13th day of May A. D., 1921.

FRANK W. MERRILL.